(12) United States Patent
Banga et al.

(10) Patent No.: US 12,149,937 B2
(45) Date of Patent: Nov. 19, 2024

(54) SYSTEMS AND METHODS FOR PROVIDING EXTENDED AUTHENTICATION SESSIONS ON POINT OF SALE DEVICES

(71) Applicant: JPMORGAN CHASE BANK, N.A., New York, NY (US)

(72) Inventors: Jasbir Banga, Swedesboro, NJ (US); Ryan S Yoder, Tampa, FL (US); Mizan Miah, Wilmington, DE (US); Muralidhar Somapalli, Tampa, FL (US); Neill Clayton-Smith, Claymont, DE (US); Reetu Bok, Philadelphia, PA (US); Sandeep Reddy Banala, Monroe, NJ (US); Scott R Moser, Safety Harbor, FL (US); Bipin More, Mumbai (IN); Suresh Madhavan, Edison, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 146 days.

(21) Appl. No.: 17/664,190

(22) Filed: May 19, 2022

(65) Prior Publication Data
US 2023/0319566 A1 Oct. 5, 2023

(30) Foreign Application Priority Data
Mar. 29, 2022 (IN) .............................. 202211018329

(51) Int. Cl.
*H04W 12/084* (2021.01)
*H04L 9/40* (2022.01)

(52) U.S. Cl.
CPC ....... *H04W 12/084* (2021.01); *H04L 63/0807* (2013.01); *H04L 63/083* (2013.01); *H04L 63/0876* (2013.01)

(58) Field of Classification Search
CPC ............. H04W 12/084; H04L 63/0807; H04L 63/083; H04L 63/0876
See application file for complete search history.

(56) References Cited

U.S. PATENT DOCUMENTS

| | | | |
|---|---|---|---|
| 10,413,238 B1 * | 9/2019 | Cooper | A61B 5/1118 |
| 11,088,993 B2 * | 8/2021 | Wardell | H04L 67/563 |
| 2006/0156385 A1 * | 7/2006 | Chiviendacz | H04L 9/3271 726/2 |

(Continued)

*Primary Examiner* — Abu S Sholeman
(74) *Attorney, Agent, or Firm* — GREENBERG TRAURIG LLP

(57) ABSTRACT

A method for extended authentication sessions on an electronic device may include an authentication service computer program executed by an authentication service electronic device: receiving a customer identifier for a customer and a unique identifier for a mobile electronic device; authenticating the customer based on the customer identifier and the unique identifier for the mobile electronic device; setting a device cookie that is specific to the mobile electronic device on the mobile electronic device; and providing the device cookie and a client secret to an OAuth services backend, wherein the OAuth services backend validates the customer identifier and client secret and generates a first token and a second token, the first token having an expiration that is shorter than that of the second token. The mobile electronic device is configured to receive and store the first token and the second token.

14 Claims, 4 Drawing Sheets

(56) References Cited

U.S. PATENT DOCUMENTS

2014/0007213 A1* 1/2014 Sanin .................. H04L 63/0807
　　　　　　　　　　　　　　　　　　　　　　　　726/9
2018/0234464 A1* 8/2018 Sim ...................... H04L 9/3213
2020/0177576 A1* 6/2020 Vudathu ............. H04L 63/0815

* cited by examiner

SYSTEMS AND METHODS FOR PROVIDING EXTENDED AUTHENTICATION SESSIONS ON POINT OF SALE DEVICES

RELATED APPLICATIONS

This application claims priority to, and the benefit of, Indian Provisional Patent Application No. 202211018329, filed Mar. 29, 2022, the disclosure of which is hereby incorporated, by reference, in its entirety.

BACKGROUND OF THE INVENTION

1. Field of the Invention

Embodiments are generally directed to systems and methods for extended authentication sessions on point-of-sale devices.

2. Description of the Related Art

In general, merchants using point of sale applications on their point-of-sale devices to interface with merchant acquirers are automatically logged out of the point-of-sale applications after a certain period of time. This prevents the merchant from processing credit card transactions on the point-of-sale device until the merchant logs in again.

SUMMARY OF THE INVENTION

Systems and methods for extended authentication sessions on point-of-sale devices are disclosed. In one embodiment, a method for extended authentication sessions on a mobile electronic device may include: (1) receiving, at an authentication service computer program executed by an authentication service electronic device, a customer identifier for a customer and a unique identifier for a mobile electronic device; (2) authenticating, by the authentication service computer program, the customer based on the customer identifier and the unique identifier for the mobile electronic device; (3) setting, by the authentication service computer program, a device cookie that is specific to the mobile electronic device on the mobile electronic device; and (4) providing, by the authentication service computer program, the device cookie and a client secret to an OAuth services backend, wherein the OAuth services backend validates the customer identifier and client secret and generates a first token and a second token, the first token having an expiration that is shorter than that of the second token. The mobile electronic device is configured to receive, from the OAuth services backend, the first token and the second token and store the first token and the second token.

In one embodiment, the unique identifier for the mobile electronic device is a universal unique identifier.

In one embodiment, the mobile electronic device may be configured to save the first token and the second token in a keychain.

In one embodiment, the mobile electronic device may include a mobile point of sale device.

In one embodiment, the device cookie may include the customer identifier and the unique identifier for the mobile electronic device.

In one embodiment, the first token and the second token may include the customer identifier, the unique identifier for the mobile electronic device, and the device cookie.

In one embodiment, the method may also include further authenticating, by the authentication service computer program, the customer based using out-of-band authentication.

According to another embodiment, a method for providing extended authentication sessions on a mobile electronic device may include: (1) receiving, at an Application Programming Interface (API) gateway application, a first transaction call from a mobile electronic device comprising a first token, a device cookie, a customer identifier for a customer, and a unique identifier for the mobile electronic device; (2) validating, by the API gateway application, the customer based on the customer identifier; (3) determining, by the API gateway application, that the first token has expired; (4) returning, by the API gateway application, an error to the mobile electronic device; (5) receiving, by the API gateway application and from the mobile electronic device, a second transaction call comprising a second token, a device cookie, the customer identifier, and the unique identifier for the mobile electronic device, wherein the second token has a longer expiration than the first token; (6) validating, by the API gateway application, the customer based on the customer identifier; (7) determining, by the API gateway application, that the second token has not expired; and (8) generating, by the API gateway application, a new first token and a new second token, wherein the new second token has a longer expiration than the new first token. The mobile electronic device is configured to store the new first token and the new second token.

In one embodiment, an OAuth service provider may be configured to invalidate the first token and the second token in response to the generation of the new first token and the new second token.

In one embodiment, the device cookie may include the customer identifier and the unique identifier for the mobile electronic device.

In one embodiment, the first token and the second token may include the customer identifier, the unique identifier for the mobile electronic device, and the device cookie.

In one embodiment, the new first token and the new second token may include the customer identifier, the unique identifier for the mobile electronic device, and the device cookie.

In one embodiment, the error may be a 401 unauthorized error.

According to another embodiment, an electronic device may include a memory storing an authentication service computer program and a computer processor. When executed by the computer processor, the authentication service computer program may cause the computer processor to: receive a customer identifier for a customer and a unique identifier for a mobile electronic device; authenticate the customer based on the customer identifier and the unique identifier for the mobile electronic device; set a device cookie on the mobile electronic device; and provide the device cookie and a client secret to an OAuth services backend, wherein the OAuth services backend is configured to validate the customer identifier and client secret and generate a first token and a second token, the first token having an expiration that is shorter than that of the second token, wherein the first token and the second token include the customer identifier, the unique identifier for the mobile electronic device, and the device cookie, and the mobile electronic device is configured to receive, from the OAuth services backend, the first token and the second token and store the first token and the second token.

In one embodiment, the unique identifier for the mobile electronic device may be a universal unique identifier.

In one embodiment, the mobile electronic device may be configured to save the first token and the second token in a keychain.

In one embodiment, the mobile electronic device may include a mobile point of sale device.

In one embodiment, the device cookie may include the customer identifier and the unique identifier for the mobile electronic device.

In one embodiment, the first token and the second token may include the customer identifier, the unique identifier for the mobile electronic device, and the device cookie.

In one embodiment, the authentication service computer program may also cause the computer processor to further authenticate the customer based using out-of-band authentication.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for extended authentication sessions on electronic devices, such as point of sale devices (including mobile, app-based, fixed, etc.). For example, embodiments may: allow an application executed on an electronic device (e.g., a merchant point-of-sale device) to extend an authentication session having an expired token (e.g., a short-lived token) using a second token (e.g., a long-lived token); provide a new channel to support authentication on by the application; issue a long-lasting access token to the application to enable invoking micro services APIs; and support user/account entitlements as claims in the access token that can be then enforced by API Services; map a token to a session involving a user and/or device by including a user identifier and/or a device identifier in the token.

Although embodiments may be disclosed in the context of point-of-sale devices or electronic devices (e.g., computers) executing point-of-sale applications, it should be recognized that these are illustrative only and embodiments have applicability beyond such devices.

Figure 1:
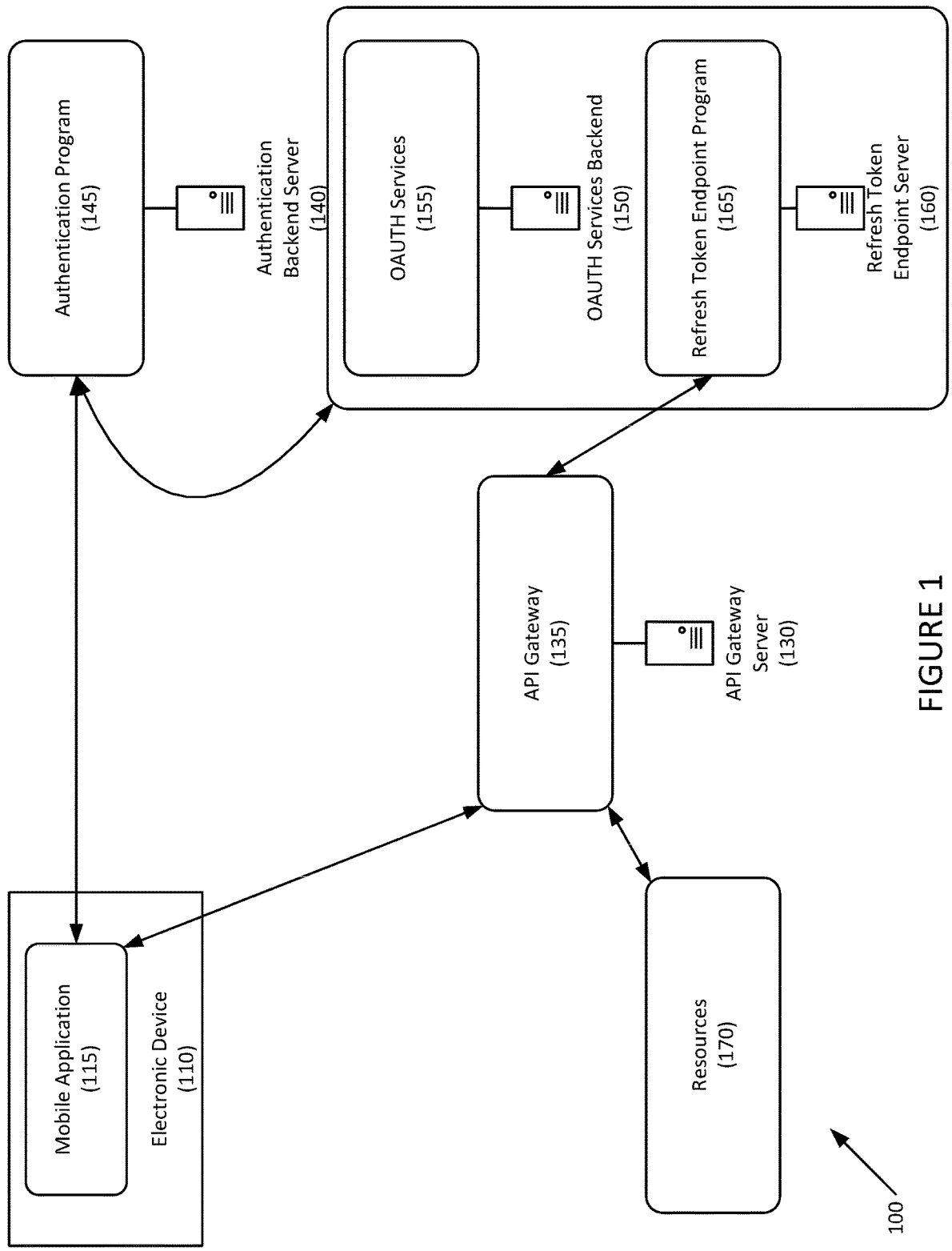
FIG. 1 depicts a system for extended authentication sessions on point-of-sale devices according to an embodiment.

Referring to FIG. 1, a system for providing extended authentication sessions on electronic devices is provided according to an embodiment. System 100 may include mobile application 115 that may be executed by electronic device 110. Electronic device 110 may be any suitable electronic device that may use authenticated sessions, such as point-of-sale devices (both fixed and mobile, attachments to such devices, etc.), electronic devices executing point-of-sale applications, computers (e.g., smartphones, tablet computers, etc.), etc.

Mobile application 115 may interface with authentication program 145, which may be executed on authentication backend server 140. Authentication backend server 140 may be any suitable server, including physical and/or cloud-based servers. In one embodiment, authentication program 145 may authenticate mobile application 115, a user accessing mobile application 115, etc.

API gateway 135 may be a computer program executed by API gateway server 130, and may interface with an Open Authentication ("OAuth") services 155, which may be executed on OAuth services backend 150. OAuth services backend 150 may include any suitable server, including physical and/or cloud-based servers. OAuth services 155 may be provided by a third party.

OAuth services 155 may provide OAuth and/or OAuth 2.0 services.

API gateway 135 may further interface with refresh token endpoint program 165, which may be executed on refresh token endpoint server 160.

Resources 170 may be any resources that may be accessed by mobile application 115. Resources 170 may be accessed via API gateway 135.

Figure 2:
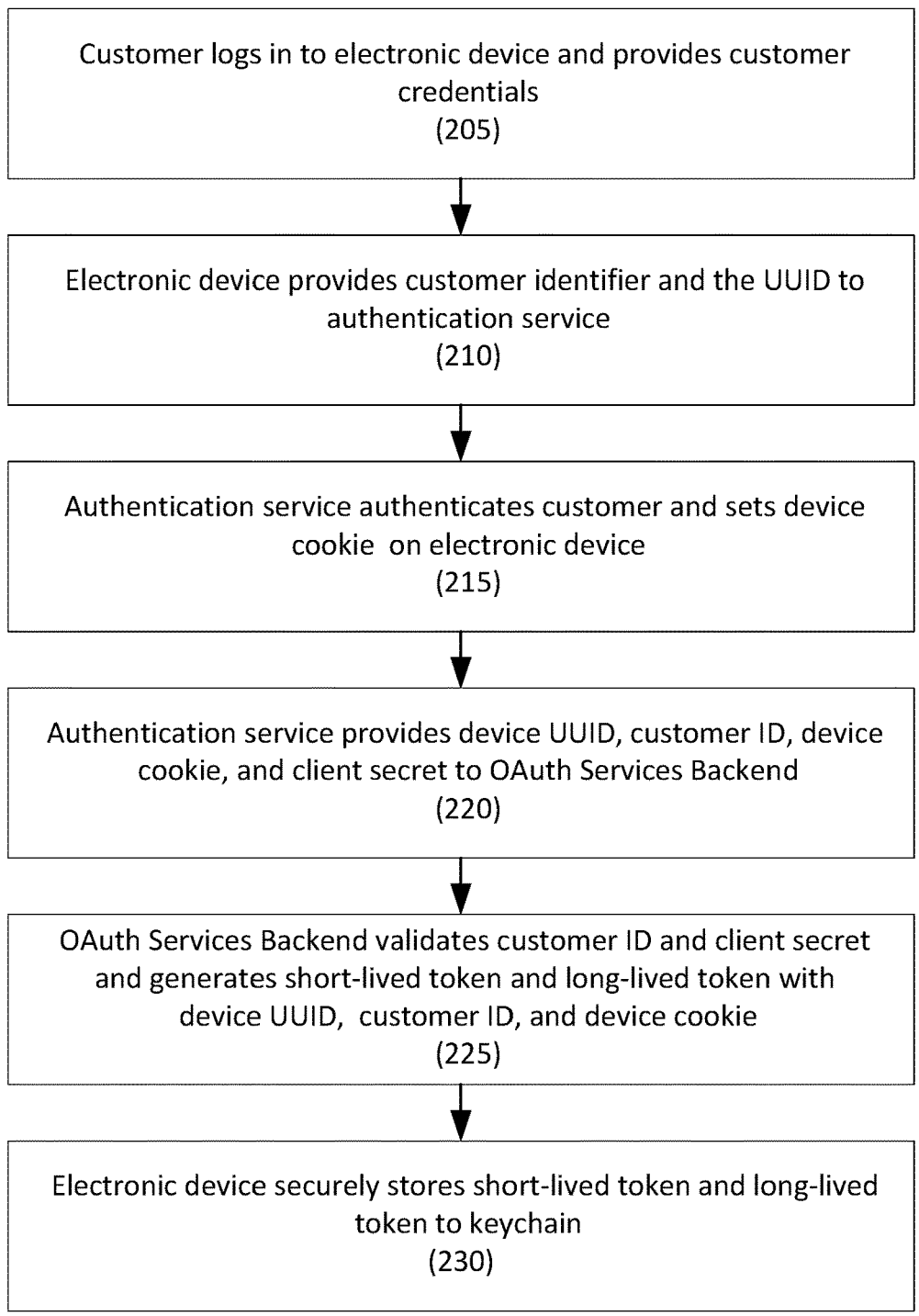
FIG. 2 depicts a method for generating a short-lived token and a long-lived token that provide extended authentication sessions on point-of-sale devices according to one embodiment.

Referring to FIG. 2, a method for generating a short-lived token and a long-lived token for extended authentication sessions on electronic devices is provided according to an embodiment. In FIG. 2, a customer has already been registered with an authentication server, and a customer identifier has been established for the user.

In step 205, a customer or user may log in to an electronic device using the customer's credentials, such as a username and password. The electronic device may then retrieve the customer identifier for the username.

In step 210, the electronic device may provide the customer ID, and a universal unique identifier ("UUID") or similar for the electronic device to an authentication service. In one embodiment the electronic device may also provide the customer's credentials to the authentication service.

In step 215, based on the customer ID, the device UUID, and optionally the customer's credentials, the authentication service may authenticate the customer and may set an identifier, such as a device cookie, on the electronic device. The device cookie may include the customer ID and the device UUID, making it specific to both the customer and the electronic device. This prevents the device cookie from being replayed from a different device and/or by a different customer.

In one embodiment, the authentication service may use out-of-band communication to authenticate the customer as necessary. For example, the authentication service computer program may send an authentication message via SMS text, email, etc. to a registered SMS address, email address, etc. for the customer.

In step 220, the authentication service may provide the device cookie to an OAuth services backend. The authentication service may also provide a client secret for the OAuth client. The authentication services acts as an OAuth client and save the client secret and sends it to OAuth server for authorization.

In one embodiment, the authentication service may provide the information to a second, or external, API gateway.

In step 225, the OAuth services backend may validate the customer ID and the client secret, and may generate two tokens—a first token (e.g., a short-lived token) and a second token (e.g., a long-lived token). The short-lived token may expire after a first period of time (e.g., 15 minutes), and the long-lived token may expire after a longer period of time (e.g., 2 hours). It should be noted that these timings are exemplary only, and other timings may be used as is necessary and/or desired. In addition, the timings may be configurable or dynamic as is necessary and/or desired.

In one embodiment, the short-lived token and the long-lived token may each incorporate the UUID for the device, the customer identifier, and the device cookie. In another embodiment, the short-lived token and the long-lived token may each incorporate the customer identifier and the device cookie.

In step 230, the electronic device may receive the tokens from the OAuth services backend and may securely store the tokens in its keychain or in any other suitable storage.

Figure 3A:
FIGS. 3A and 3B depict a method for using short-lived tokens and long-lived tokens for extended authentication sessions on point-of-sale devices according to an embodiment.
Figure 3B:
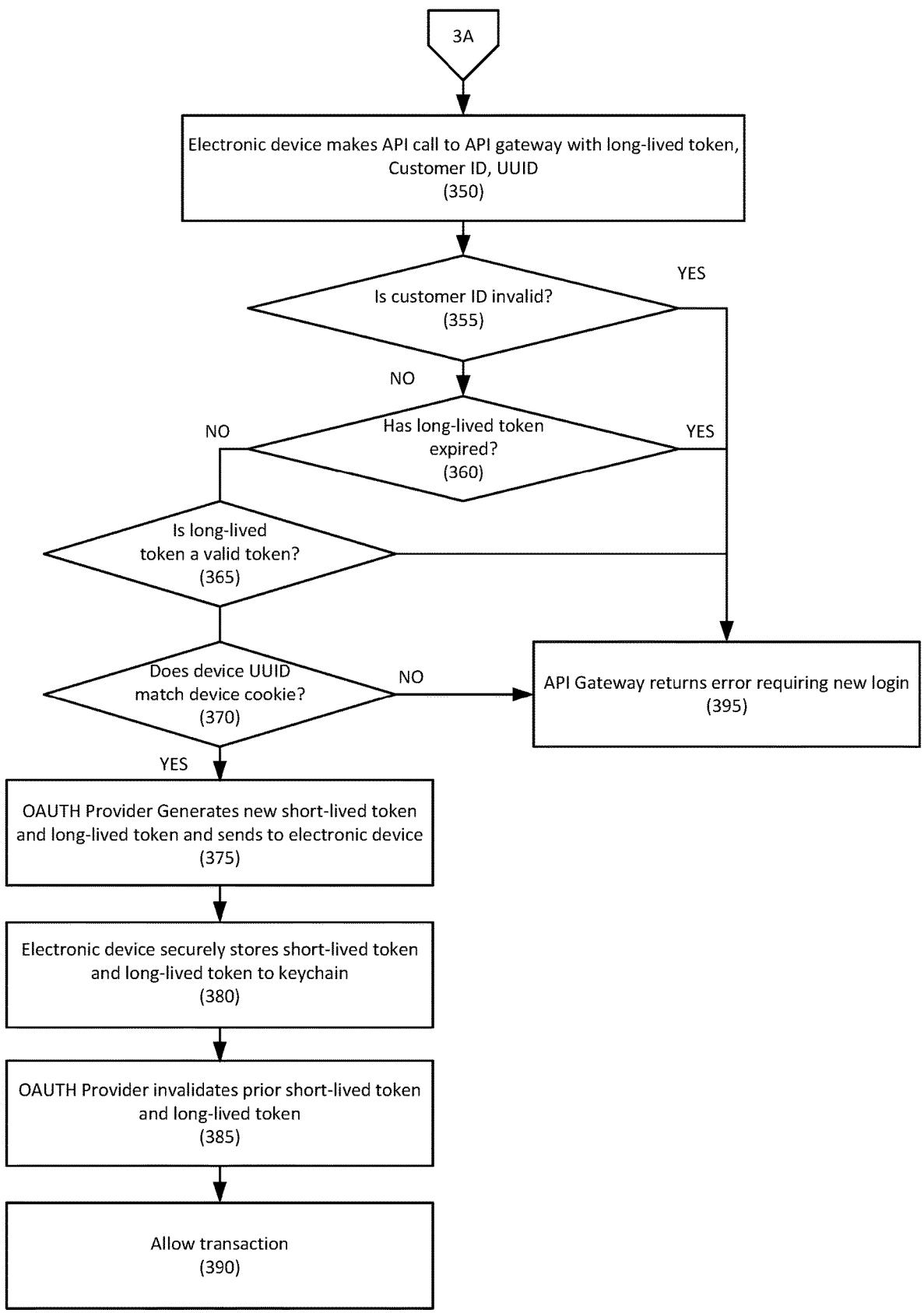

Referring to FIGS. 3A and 3B, a method for using short-lived tokens and long-lived tokens for extended authentication sessions on electronic sale devices is provided according to an embodiment.

In step 305, an electronic device application, such as an application executed by a mobile point of sale device, may make a transaction call to an API Gateway with a first token (e.g., a short-lived token), a device cookie, a customer identifier, and a device UUID for the electronic device. In another embodiment, the electronic device application may make the call with the first token (e.g., a short-lived token) and the device cookie.

In step 310, the API gateway may validate the customer ID. If the customer ID does not match, in step 345, the API gateway may return an error to the mobile electronic device.

If the customer ID is valid, in step 315, the API gateway may check to see if the short-lived token has expired. If the short-lived token has not expired, in step 320, the API gateway may call an API for a resource. In step 325, the API for the resource may validate the short-lived token using Public key signature validation.

If the short-lived token is valid, in step 330, the API for the resource may check if the device UUID and the device cookie are the same in the request header and in the short-lived token. If they are, in step 335, the transaction may be allowed. If they are not, in step 340, the API gateway or the API for the resource may return an error requiring a new login.

If, in step 310, the short-lived token has expired, in step 345, the API gateway may return an error, such as a 401 unauthorized error, to the mobile electronic device, and the process may continue to step 350 in FIG. 3B.

In step 350, the electronic device application may make an API call to the API gateway with a second token (e.g., a long-lived token), the customer ID, and the device UUID.

In step 355, the API gateway may validate the customer ID. If the client ID does not match, in step 390, the API gateway may return an error to the mobile electronic device.

If the customer ID is valid, in step 360, the API gateway may determine whether the long-lived token has expired. If it has not expired, in step 365, the refresh token endpoint server may check to see if the long-lived token is a valid token both by public key signature validation and by database validation.

If the long-lived token is a valid token, in step 370, the refresh token endpoint server may check if the device UUID and the device cookie are the same in the request header and in the long-lived token. If they match, in step 375, the OAuth provider may generate a first token (e.g., a new short-lived token) and a new second token (e.g., a new long-lived token) and may provide the tokens to the mobile electronic device. The tokens may include the device UUID, the customer identifier, and the device cookie. In step 380, the electronic device may store the tokens securely in its keychain or in any other suitable storage.

In step 385, the OAuth provider may invalidate the prior short-lived and long-lived tokens, by, for example, deleting the tokens from an approved list, adding the tokens to an expired list, etc. In step 390, the transaction may then be allowed.

If, in step 355, the customer ID is invalid, or if the long-lived token has expired, is invalid, or if the device UUID does not match the device cookie, in step 395, the API gateway may return an error requiring a new login.

Although several embodiments have been disclosed, the embodiments are not exclusive, and features disclosed in one embodiment may be used with other embodiments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler, or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be a non-transitory medium in the form of a compact disc, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing extended authentication sessions on a mobile electronic device, comprising:
    receiving, at an authentication service computer program executed by an authentication service electronic device, a customer identifier for a customer and a unique identifier for a mobile electronic device;
    authenticating, by the authentication service computer program, the customer based on the customer identifier and the unique identifier for the mobile electronic device;
    setting, by the authentication service computer program, a device cookie that is specific to the mobile electronic device on the mobile electronic device;
    providing, by the authentication service computer program, the device cookie and a client secret to an OAuth services backend, wherein the OAuth services backend validates the customer identifier and client secret and generates a first token and a second token, the first token having an expiration that is shorter than that of the second token, the second token including a public key and the unique identifier; and
    determining, by a refresh token endpoint server, if the second token has not expired, if the second token is valid by both by the public key and a database record, and if the unique identifier in the second token matches the received unique identifier;
    wherein the mobile electronic device is configured to receive, from the OAuth services backend, the first token and the second token and store the first token and the second token.

2. The method of claim 1, wherein the unique identifier for the mobile electronic device is a universal unique identifier.

3. The method of claim 1, wherein the mobile electronic device is configured to save the first token and the second token in a keychain.

4. The method of claim 1, wherein the mobile electronic device comprises a mobile point of sale device.

5. The method of claim 1, wherein the device cookie comprises the customer identifier and the unique identifier for the mobile electronic device.

6. The method of claim 1, wherein the first token and the second token comprise the customer identifier and the device cookie.

7. The method of claim 1, further comprising:
    further authenticating, by the authentication service computer program, the customer based using out-of-band authentication.

8. A method for providing extended authentication sessions on a mobile electronic device, comprising:
    receiving, at an Application Programming Interface (API) gateway application, a first transaction call from a mobile electronic device comprising a first token, a device cookie, a customer identifier for a customer, and a unique identifier for the mobile electronic device;
    validating, by the API gateway application, the customer based on the customer identifier;
    determining, by the API gateway application, that the first token has expired;
    returning, by the API gateway application, an error to the mobile electronic device;
    receiving, by the API gateway application and from the mobile electronic device, a second transaction call comprising a second token, a device cookie, the customer identifier, and the unique identifier for the mobile electronic device, wherein the second token has a longer expiration than the first token;
    validating, by the API gateway application, the customer based on the customer identifier;
    determining, by the API gateway application, that the second token has not expired;
    generating, by the API gateway application, a new first token and a new second token, wherein the new second token has a longer expiration than the new first token, the second token including a public key and the unique identifier; and
    determining, by a refresh token endpoint server, if the second token has not expired, if the second token is valid by both by the public key and a database record, and if the unique identifier in the second token matches the received unique identifier;
    wherein the mobile electronic device is configured to store the new first token and the new second token.

9. The method of claim 8, wherein an OAuth service provider is configured to invalidate the first token and the second token in response to the generation of the new first token and the new second token.

10. The method of claim 8, wherein the device cookie comprises the customer identifier and the unique identifier for the mobile electronic device.

11. The method of claim 8, wherein the first token and the second token comprise the customer identifier and the device cookie.

12. The method of claim 8, wherein the new first token and the new second token comprise the customer identifier, the unique identifier for the mobile electronic device, and the device cookie.

13. The method of claim 8, wherein the error is a 401 unauthorized error.

14. The method of claim 8, wherein the mobile electronic device comprises a mobile point of sale device.

* * * * *